(No Model.) 2 Sheets—Sheet 1.
R. LIEB.
METHOD OF AND APPARATUS FOR MAKING COLORED FIGURES IN KNIT GOODS.
No. 488,019. Patented Dec. 13, 1892.
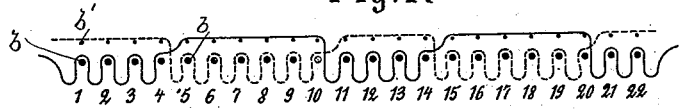
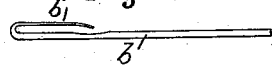
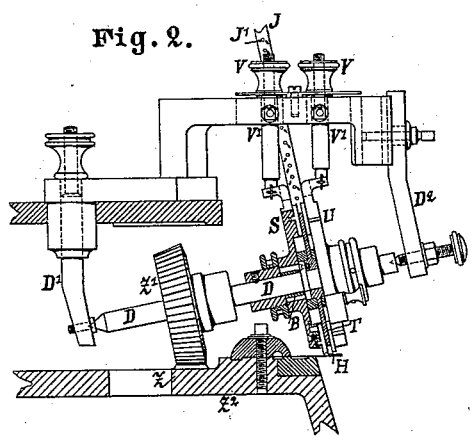
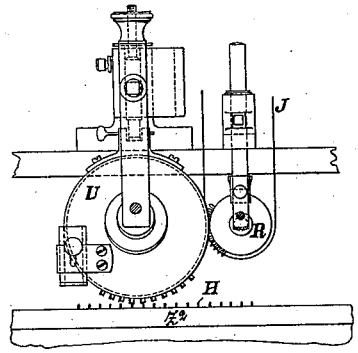
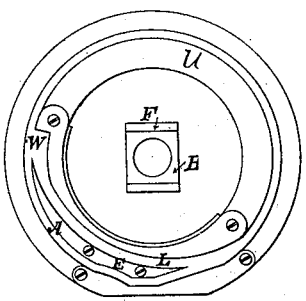
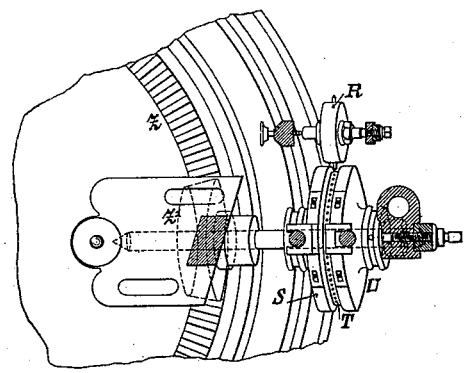
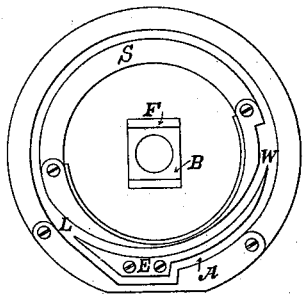
 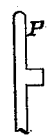
Witnesses: Inventor:
Wm. Schulz R. Lieb
A. Jonghmans by his attorneys
Roeder & Briesen
THE NORRIS PETERS CO., PHOTO-LITHO., WASHINGTON, D. C.

(No Model.) 2 Sheets—Sheet 2.
R. LIEB.
METHOD OF AND APPARATUS FOR MAKING COLORED FIGURES IN KNIT GOODS.
No. 488,019. Patented Dec. 13, 1892.
Fig. 9.
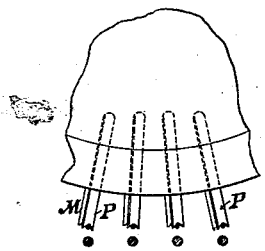
Fig. 11.
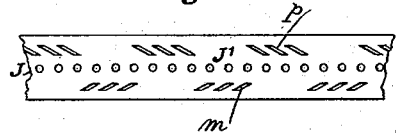
Fig. 10.
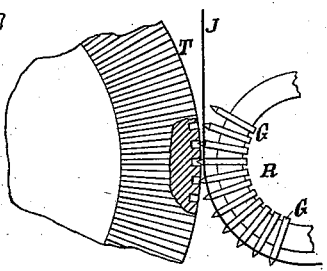
Fig. 12.
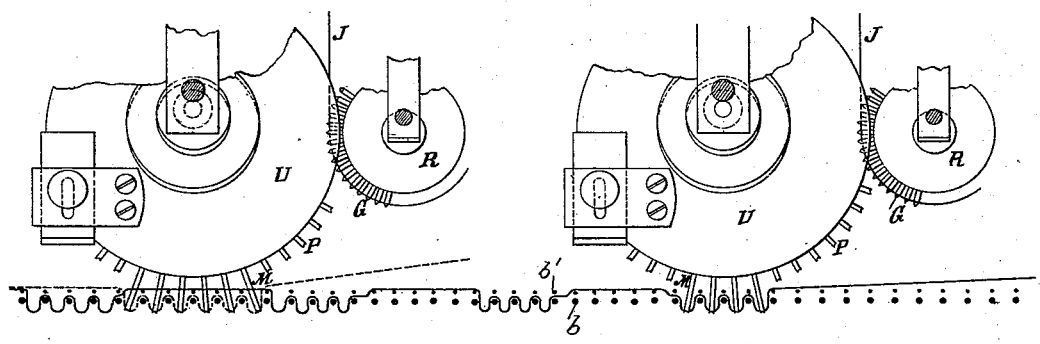
Fig. 13ª.   Fig. 13ᵇ.   Fig. 14ª.   Fig. 14ᵇ.
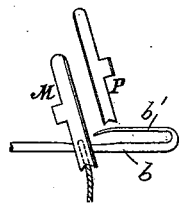 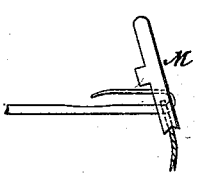 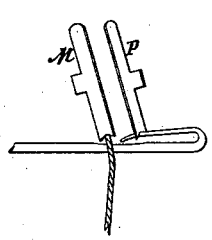 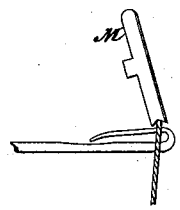

UNITED STATES PATENT OFFICE.

ROBERT LIEB, OF ROTTENBURG, GERMANY, ASSIGNOR TO FOUQUET & FRANZ, OF SAME PLACE.

METHOD OF AND APPARATUS FOR MAKING COLORED FIGURES IN KNIT GOODS.

SPECIFICATION forming part of Letters Patent No. 488,019, dated December 13, 1892.

Application filed November 5, 1891. Serial No. 410,943. (No model.)

*To all whom it may concern:*

Be it known that I, ROBERT LIEB, a citizen of the Kingdom of Würtemberg, residing at Rottenburg, in the Kingdom of Würtemberg and Empire of Germany, have invented an Improved Method of and Apparatus for Making Colored Figures in Knit Goods, of which the following is a specification.

This invention relates to a mode of and a mechanism for producing figured colored knitted goods.

The invention can be practiced upon any knitting-machine, and is here shown to be applied to a French circular machine.

The novelty of the process consists in placing the meshes or pattern-stitches into the needles in such a way that each colored thread is engaged by its respective needle to form a mesh wherever it is to appear in the face of the fabric while it is stretched as a float over the other needles. After all the threads are placed in the above manner (each by an adjoining special apparatus) and are pressed off the needles the meshes upon the face of the fabric constitute the pattern, while the floats lie upon the rear side of the fabric. It is to be observed that the needles that form the meshes of one thread are used for forming the floats of the other threads, and vice versa.

Figure 1 represents a series of adjoining needles in cross-section with two threads deposited thereon by the mechanism herein described. To produce a pattern of four black and six white stitches, the black thread is introduced into the beards $b'$ of needles $b$, 1 2 3 4, 11 12 13 14, 21 22 23 24, &c., and is pressed between the needles for the formation of meshes, while it is floated over the beards of needles 5 6 7 8 9 10, 15 16 17 18 19 20, &c. The white thread, on the contrary, is floated over the beards of needles 1 2 3 4, 11 12 13 14, 21 22 23 24, &c., and is introduced into the beards of needles 5 6 7 8 9 10, 15 16 17 18 19 20. The meshes and floats thus formed are pressed off the needles in the ordinary manner.

In order to deposit the threads upon the needles in the above manner, I employ simultaneously mesh-plates and press-plates, which may be put in and out of action in such a way that in forming the meshes the mesh-plates only are acting while the press-plates are out of action and that in forming the floats the press-plates are acting while the mesh-plates are out of action.

In the accompanying drawings, which represent the invention applied to a French circular machine, Fig. 1 is a diagram showing the arrangement of the threads with relation to the beards of the needles. Fig. 1$^a$ represents a needle over or into the beard of which the thread is placed. Fig. 2 is a section through the knitting-machine, showing the arrangement for placing the threads; Fig. 3, a front view of the apparatus; Fig. 4, a sectional top view thereof. Figs. 5 and 6 are elevations of the guide-disks of the apparatus; Fig. 7, a side view of a mesh-plate in its proper position within the apparatus; Fig. 8, a side view of a press-plate in its proper position; Fig. 9, a side view of a portion of the mesh-plates and press-plates in the apparatus; Fig. 10, an elevation of a portion of the figuring-wheel and band-gearing with the apparatus; Fig. 11, a face view of a fragment of the figuring-band; Fig. 12, a front view of two adjoining apparatus for producing a two-colored fabric. Figs. 13$^a$ and 13$^b$ show the position of the plates and needles for introducing a thread into the beard. Figs. 14$^a$ and 14$^b$ show the position of the plates and needles for guiding a thread over the beard.

As already stated, as many apparatus are arranged side by side as there are colors to be produced upon the fabric. Thus a two-colored pattern requires two apparatus, a three-colored pattern three apparatus, &c.

Each apparatus consists of a metal plate T, Figs. 2, 4, and 10, which turns between the plates S and U, Figs. 5 and 6, and is to be arranged obliquely to the needles placed in a circle, as usual. It is set in revolution by the bevel-wheel Z', gearing into the rack Z. Both faces of the plate T are provided completely around their circumference with slots, as shown in Fig. 10. Into the slots of one face are set the mesh-plates M, Fig. 7, and into the slots of the other face are set the press-plates P, Fig. 8. The mesh and press plates are composed of bars, the notched ends of which project out of the guide-slots. The bars are provided with projections that engage annular grooves of the plates S and U. The three plates or disks T, S, and U are mounted upon a common shaft D, Fig. 2, having a pointed inner end and a socket at the outer end. These ends are received by bearings screwed into the adjusting-arms D' and D².

The base-plate Z² of the machine is provided with the circular rack Z, while below the mesh and press plates there is arranged a circle of needles H. Near the central disk T there is journaled in the machine-frame a wheel R, which is at its rim provided with the pins G. Around this sprocket-wheel a figuring-band J is placed, which has a central row of perforations J', Fig. 11, and two rows of slits $m\ p$, placed obliquely to each other. These slits, in conjunction with the annular grooves of the disks S and U, operate the plates in manner hereinafter described. When the base-plate Z² is revolved, motion will be imparted to shaft D and the circle of needles H will be guided beneath the plates S T U. The disk T, being fast upon shaft D, will revolve with the same. The disks S and U are provided with rectangular central shoulders F, by which they are held upon a box B, mounted loosely on shaft D. The disks are suspended from the machine-frame by screw-bolts V', supported by nuts V. By raising or lowering the bolts the disks S and U may be set at a different eccentric position in relation to the shaft D. By a revolution of the disk T the mesh and press plates are conducted around in a circle and will, with their projections, be guided in the grooves of the disks S and U. Each groove runs essentially concentric to its disk, but is upon a part of its length divided into two paths by a tongue E, Figs. 5 and 6. As the plates with the projections entering the grooves are conducted into either one or the other of the paths they will come into or out of action with the circle of needles, as above described.

The above motion of the plates is effected by the slitted figuring-band J, which is fed tangentially to disk T by the sprocket-wheel R. The motion of wheel R takes place with the same circumferential velocity as that of disk T, as the pins G of the wheel enter through the perforations J' of the band into the circumferential slots of disk T. Each row of slits on the figuring-band is placed opposite to a circle of mesh-plates or press-plates. If the plates while passing the band arrive opposite to the slits, they receive no displacement and enter at the point W of the tongue, Figs. 5 and 6, into the outer or working groove A. This groove is so shaped that it imparts such a motion to each plate as the latter is to make in its above-described co-operation with the needles. If, however, the plates arrive opposite the solid parts on the band, they are conducted at the point W into the inner groove L and remain out of action when they pass a circle of needles.

The previously-mentioned eccentric adjustability of the disks S and U has for its object, first, to permit the plates to be so set that the meshes may be formed longer and shorter by the mesh-plates, and, secondly, that the needle-points may be pressed stronger or lighter upon the needles by the press-plates.

The slitted figuring-band is only necessary in the manufacture of irregular patterns, and of course each pattern requires its special band with correspondingly-arranged slits. Each circle of press-plates is in these cases provided on the disk T with a full complement of plates. If, however, regular patterns are to be produced, the band may be dispensed with. In this case not all the circumferential notches of the disk T are provided with plates, but only so many mesh and press plates are arranged in relation to each other that they will come into action at regular intervals to correspond to the pattern desired. Each plate will then come into action with the circle of needles, because it enters each time the working grooves of the disks S and U.

Fig. 12 represents how the several apparatus placed next to each other come into action. As stated, a special apparatus is necessary for the formation of the meshes and floats of each thread and the several apparatus are arranged next to each other over the circle of needles H. Where the first apparatus forms floats with one thread, the second apparatus forms meshes with the other thread. If three, four, &c., threads are to be introduced, the float-spaces of the first apparatus are employed by all other apparatus consecutively for the formation of meshes by their threads. This is effected in such a manner that the second apparatus fills in with meshes but a part of the space floated by the first apparatus. The third apparatus fills in a part of the space left empty by the second apparatus, &c., until finally the last apparatus places meshes into all the needles that have still remained empty. Back of the last apparatus there is arranged the well-known device for pressing the meshes from the needles. The outside of the fabric as it hangs upon the needles will be the one upon which the float has been formed, while the pattern will have been formed upon the side facing the circle of needles.

Figs. 13$^a$ and 13$^b$ show how the press-plate P is out of action, while the mesh-plate M is by the working groove moved downward between two needles. Upon the other side of the needle a mesh-plate is also moved down, so that the thread is laid across the needle. The needle then receives the thread in its beard during the outward movement of the thread beneath the plates, Fig. 13$^b$. In Figs. 14$^a$ and 14$^b$ the mesh-plates M are at rest, while the press-plate P closes the needle-tip, Fig. 14$^a$, so that the needle-beard slips beneath the thread, Fig. 14$^b$. In accordance with the obliquely-arranged slits of the figuring-band the plates M and P are also obliquely arranged in relation to each other.

What I claim is—

1. The method of producing figures in knitted goods, which consists in placing the threads required of each color consecutively into the needles corresponding to the pattern, so that the meshes are made to appear upon the face of the fabric, while each thread is stretched over the needles not provided by it with meshes, whereby it forms a float upon the rear of the fabric, substantially as specified.

2. The combination of plate T with disks S and U, having grooves A and L, and with mesh-plates M and press-plates P, substantially as specified.

3. The combination of plate T with grooved disks S and U, mesh-plates M, press-plates P, wheel R, and a figuring-band J, substantially as specified.

In testimony whereof I hereunto sign my name, in the presence of two subscribing witnesses, this 16th day of October, 1891.

ROBERT LIEB.

Witnesses:
LEOPOLD HOCHSTETTER,
*Engineer, Rottenburg.*
FRIEDRICH KRIEGER.